United States Patent [19]

Willis et al.

[11] Patent Number: 5,002,676

[45] Date of Patent: Mar. 26, 1991

[54] BLOCK COPOLYMERS

[75] Inventors: Carl L. Willis; Donn A. DuBois, both of Houston, Tex.

[73] Assignee: Shell Oil Company, Houston, Tex.

[21] Appl. No.: 446,827

[22] Filed: Dec. 6, 1989

[51] Int. Cl.$^5$ .......................................... C10M 145/14
[52] U.S. Cl. .................................. 252/56 R; 526/329; 525/330.3; 525/330.6
[58] Field of Search .......................... 525/330.3, 330.6; 252/56 R; 526/329

[56] References Cited

U.S. PATENT DOCUMENTS

| | | | |
|---|---|---|---|
| 4,069,180 | 1/1978 | Chalmers | 525/330.3 |
| 4,388,448 | 6/1983 | Melby | 525/327.3 |
| 4,533,482 | 8/1985 | Bollinger | 252/56 R |
| 4,756,843 | 7/1988 | Jarrin et al. | 252/56 R |
| 4,844,829 | 7/1989 | Wilburn et al. | 252/56 R |
| 4,889,900 | 12/1989 | DuBois | 526/77 |

FOREIGN PATENT DOCUMENTS 298667  1/1987  European Pat. Off. .

OTHER PUBLICATIONS

Long et al., Anionic Synthesis and Characterization of Various Poly(Alkyl Methacrylates), Polymer Prepatation, 27(2), 258 (1986).

Long et al., Synthesis and Characterization of Ion-Containing Block Copolymers by Anionic Techniques, Polymer Preprints 28(1), 384 (1987).

Allen et al., Synthesis of Tactic Poly(alkyl Methacrylate) Homo and Copolymers, Advances in Polymer Synthesis, 347 (1985).

Allen et al., Studies on the Synthesis of Novel Block Ionomers, ACS Symposium Series, 302, 79 (1986).

Anderson, "Speed" Marvel at DuPont, J. Macromol, Sci.-Chem., A21, 1665–1687, (1984).

Ph.D. Dissertation, Long, Virginia Polymer Institute, Oct. 1989, pp. 53–63.

*Primary Examiner*—Jacqueline V. Howard

[57] ABSTRACT

Novel, selectively hyrogenated block compolymers, which compolymers comprise at least one block of polymerized alkyl methacrylate and one block of polymerized conjugated alkadiene, provide improved dispersant properties and viscosity index improvement to hydrocarbon lubricating oils.

6 Claims, No Drawings

BLOCK COPOLYMERS

FIELD OF THE INVENTION

This invention relates to selectively hydrogenated block copolymers having polar and non-polar blocks and to lubricating oil compositions containing the block copolymers. More particularly, the invention relates to selectively hydrogenated block copolymers comprising at least one block of polymerized alkyl methacrylate and one block of at least one polymerized conjugated alkadiene. The invention also relates to the use of the selectively hydrogenated block copolymers in lubricating oil compositions.

BACKGROUND OF THE INVENTION

It is known that the addition of certain polymeric additives to hydrocarbon lubricating oils serves to enhance the performance of such oils as lubricants in internal combustion engines. One such polymeric material of acknowledged utility is a poly(methacrylate ester) which is added to engine oils to serve as a dispersant. A second type of polymeric additive is a selectively hydrogenated two-block or diblock polymer having one block of at least predominantly polymerized vinyl aromatic compound, e.g., styrene, and one block of at least predominantly polymerized conjugated alkadiene, e.g., butadiene or isoprene. The diblock polymer is selectively hydrogenated to reduce the residual unsaturation of the aliphatic (polyalkadiene) portion while not hydrogentating the aromatic unsaturation. Such selectively hydrogenated diblock polymers are employed as viscosity index improvers in lubricating oils. A number of these polymers are commercial, being marketed under the SHELLVIS ® trademark by Shell Oil Company. It would be advantageous to provide to a lubricating oil a polymethacrylate polymer and also the selectively hydrogenated diblock polymer in order to obtain the advantages of both types of additive in a lubricating oil composition.

In practice, however, such addition of both types of additive is not always feasible. The practice of most commercial engine oil formulators is to start with an oil concentrate of about 6% to about 12% by weight of polymeric additive and dilute the concentrate with an oil of selected properties to obtain the final formulated engine oil. At these concentrations, in engine oil, physical mixtures of polymethacrylate esters and the selectively hydrogenated diblock polymers are immiscible and separate into two distinct phases with one polymeric additive in each phase. Engine oil formulators are not able to handle, and do not handle, such unstable systems.

Attempts have been made to chemically combine the polymethacrylate ester function and a polyalkadiene function in a single polymeric molecule and thereby avoid such compatibility problems. Bollinger, U.S. Pat. No. 4,533,482, describes random copolymers of alkyl acrylate or methacrylate and a conjugated diene wherein the aliphatic unsaturation has been hydrogenated. Such polymers are relatively high molecular weight materials having a molecular weight from about 80,000 to about 1,000,000. The polymers are said to be viscosity improvers for lubricating oils but do not provide dispersant properties. In order to gain such dispersant properties, a nitrogen-containing monomer is grafted onto the hydrogenated polymethacrylate-polyalkadiene block polymer.

A European Patent Application No. 298,667, published Jan. 11, 1989 by McGrath et al, describes block copolymers in which one block is selected from hydrolyzable $C_2$–$C_5$ alkyl methacrylates, methacrylic acid or ionomers thereof, and at least one other block is a block of an anionically polymerized monomer other than methyl methacrylate. Illustrative of such monomers are butadiene and isoprene. The European Patent Application speaks about hydrogenation of the polymethacrylate-polyalkadiene block copolymer but the hydrogenation is not exemplified and the use of either type of block copolymer in engine oils is not suggested.

A Ph.D. dissertation submitted by Long to the faculty of the Virginia Polytechnic Institute, apparently accepted for publication in 1987, pages 53–63, also describes block copolymers having at least one polymethacrylate ester block and at least one polyalkadiene block. Selectively hydrogenated block copolymers and utilities for the non-hydrogenated block copolymers are not disclosed.

SUMMARY OF THE INVENTION

The present invention is directed to certain selectively hydrogenated block copolymers and to lubricating oil compositions incorporating such polymers. More particularly, the invention relates to selectively hydrogenated derivatives of block copolymers which have at least one block of polymerized alkyl methacrylate and one block of polymerized conjugated alkadiene. The selectively hydrogenated block copolymers provide improved dispersion properties and viscosity improvement when incorporated in a hydrocarbon lubricating oil.

DESCRIPTION OF THE INVENTION

The block copolymers whose selectively hydrogenated derivatives are the subject of the present invention are block copolymers having at least one block of polymerized alkyl methacrylate and one block of a conjugated alkadiene. In terminology of a type which is conventional for block copolymers, the base or non-hydrogenated block copolymers are termed AB or ABA copolymers wherein A represents a block of polymerized alkyl methacrylate and B represents a block of at least one conjugated alkadiene. While a variety of conjugated alkadienes of up to 10 carbon atoms inclusive are useful as the precursor of the B block, e.g., 1,3-hexadiene, piperylene, 1,3-octadiene and 3-methyl-1,3-pentadiene, the preferred conjugated alkadienes for use in the block copolymers are butadiene and isoprene, particularly isoprene. The alkyl methacrylates are those methacrylates wherein the alkyl has up to 14 carbon atoms inclusive, preferably up to 8 carbon atoms inclusive, as illustrated by methyl, ethyl, t-butyl, i-butyl, i-amyl, hexyl, decyl and dodecyl. The alkyl moiety is straight-chain or branched, but is preferably branched on the first or second carbon atom relative to the rest of the molecule. Such alkyl groups include t-butyl, sec-butyl, i-amyl, i-octyl and sec-amyl. The preferred alkyl group is t-butyl and the preferred alkyl methacrylate is t-butyl methacrylate.

The process of producing the base polymers at an acceptable rate and under acceptable reaction conditions is rather particular. In the process of producing a more conventional block copolymer, e.g., a block copolymer of a vinyl aromatic compound such as styrene and a conjugated alkadiene such as butadiene or styrene, a variety of process schemes based on the use of a metal alkyl initiator are available. Such procedures include the production by anionic polymerization of a so-called "living" polymer of either type of monomer before "crossing over" to the polymerization of the other type of monomer, sequential polymerization of block polymers of three or more alternating blocks, the use of polyfunctional coupling agents to produce branched or radial polymers and the production of blocks having a predominance of one monomer but a lesser proportion of the other monomer at one end of the block in what is termed a "tapered" block. In the production of block copolymers of alkyl methacrylate and conjugated alkadiene, somewhat different and somewhat more restrictive procedural considerations apply, in part because of the tendency of the methacrylate monomer to form species which terminate polymerization.

Initially, the alkyl methacrylate must be purified because the anionic polymerization of an alkyl methacrylate does not readily occur in the presence of even trace amounts of protic material because of the resulting chain termination. For successful polymerization, the protic material must be removed. Conventional purification of a methacrylate ester comprises contacting of the ester with calcium hydride followed by distillation from the hydride at reduced pressure. The resulting methacrylate ester is still contaminated with protic material such as alcohol and remains unsuitable for anionic polymerization because of premature chain termination. Allen et al, *Advances in Polymer Synthesis*, Plenum, (1985) suggest distillation from a trialkylaluminum such as triethylaluminum. Such a procedure works well for the lower alkyl methacrylates such as methyl methacrylate but is considered hazardous at the higher temperatures of distillation when higher molecular weight alkyl methacrylates such as t-butyl methacrylate are to be purified because of the known tendency of trialkylaluminum to cause vinyl free radical polymerization in the presence of even trace amounts of oxygen and heat. However, in the production of the polymerized higher alkyl methacrylate blocks in the base block copolymers the polymerization is conducted in a satisfactory manner when a small amount of a trialkylaluminum or trialkylborane is provided. These metal alkyl compounds appear to have little effect on the polymerization except to remove any trace amounts of water and alcohol, probably through hydrolysis or alcoholysis of the added trialkyl aluminum or boron. Utilization of this technique at the temperatures of polymerization is not considered to be hazardous and permits the production of the higher alkyl methacrylate blocks of acceptable chain length without premature chain termination.

Special considerations also apply to the order in which the blocks are produced. A living anionic polymer of alkyl methacrylate will not initiate the polymerization of a conjugated alkadiene. Thus, polymerization of the base block copolymers of the invention which are subsequently selectively hydrogenated must necessarily involve the initial production of a polymerized conjugated alkadiene portion followed by production of the alkyl methacrylate block(s).

The alkadiene block is suitably at least one alkadiene. Although mixtures of alkadienes, e.g., butadiene and isoprene, may be used to obtain a block with a random mixture of monomeric alkadienes, the use of a single alkadiene to obtain a homopolymeric block is preferred.

The initiator for the alkadiene polymerization is a metal alkyl initiator, preferably an alkali metal alkyl initiator. The use of such initiators in block polymerizations is well known and conventional. Particularly preferred in the block polymerization process of the invention is sec-butyl lithium. The polymerization preferably takes place at a moderate temperature, e.g., from about 20° C. to about 50° C. Polymerization takes place in a liquid non-polar hydrocarbon solvent such as cyclohexane in order to obtain the higher rates of reaction associated with the higher reaction temperatures permitted by the use of such a solvent. Use of a non-polar solvent results in a higher proportion of what is termed 1,4 polymerization. This type of polymerization of alkadiene monomers results when each of the four carbon atoms of the conjugated alkadiene moiety becomes incorporated in the polymer chain which then contains ethylenic unsaturation. This type of polymerization contrasts with 1,2 polymerization in which the carbon atoms of only one of the carbon-carbon double bonds become incorporated in the polymeric chain which then has pendant vinyl unsaturation. In the case of a non-symmetrical alkadiene such as isoprene, this type of polymerization could also be termed 3,4 depending on which carbon-carbon double bond is involved in the polymerization. When the preferred non-polar solvents are employed, from about 60% to about 90% of the alkadiene monomers polymerized by way of 1,4 polymerization. The presence of the ethylenic unsaturation results in cis and trans configurations of the polymer chain at each carbon-carbon double bond. Polymerization to give a cis configuration is predominant.

In a preferred embodiment of the invention, a living polyalkadiene polymer is produced by polymerization of the conjugated alkadiene in the presence of a monofunctional initiator such as sec-butyl lithium. The living polymer is then contacted with alkyl methacrylate in the presence of a trialkylaluminum or trialkylboron, e.g., triethylaluminum, to produce a block of polymerized alkyl methacrylate. Upon termination of polymerization the resulting polymer is an AB polymer where A and B have the previously stated meanings.

In an alternate embodiment of the process of the invention, the conjugated alkadiene is polymerized through the use of a difunctional alkali metal alkyl initiator. Such difunctional initiators are also conventional and are illustrated by 1,4-dilithio-1,1,4,4-tetraphenylbutane and 1,3-bis(1-lithio-1,3-dimethylpentyl)benzene. The use of such a difunctional initiator generally results in the production of a difunctional living polyalkadiene polymer which, upon the subsequent addition of a polymerized alkyl methacrylate block at each reactive site, will result in the production of an ABA polymer. Also possible is the production of an AB polymer if premature chain termination takes place. The use of a difunctional initiator may require the use of a mixed polar/non-polar reaction solvent which is often a mixture of cyclohexane and an ether such as diethyl ether. The resulting polymer has a reduced proportion of 1,4 polymerization in the polyalkadiene block.

Regardless of the functionality of the living polyalkadiene polymer, the subsequent polymerization of alkyl methacrylate is complicated by premature chain termination to some extent even when conducted in the presence of trialkylaluminum or trialkylborane. To retard such undesired chain termination it is often useful, but not always required, to "end-cap" the living polyalkadienyl polymer to alter the nature of the reactive species to be employed to initiate the polymerization of alkyl methacrylate. The use of diphenylethylene or styrene is satisfactory and conventional but, in the case of reaction of a monofunctional living polymer the rate of end-capping is unacceptably slow unless a polar co-solvent is added to the hydrocarbon solvent used for the alkadiene polymerization. Suitable polar solvents include the ethers such as diethyl ether and tetrahydrofuran. The precise proportion of polar solvent to be added is not critical and amounts of polar solvent from about 10% by volume to about 50% by volume based on total combined solvent are satisfactory. When a difunctional living polyalkadiene polymer is to be end-capped, there will likely be polar co-solvent present in the media of the polymer production. Additional polar solvent, if necessary, is added prior to end-capping to provide a mixed solvent having from about 10% by volume to about 50% by volume based on total solvent of a polar solvent such as an ether.

In the mixed polar/non-polar reaction medium, the end-capping process, when employed, is conducted by providing at least a substantially stoichiometric amount of the end-capping agent and maintaining the resulting mixture at a temperature of from about 10° C. to about 30° C. The resulting product is a living polymer having reactive sites of the illustrative formula

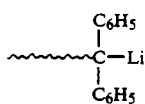

wherein the wavy line represents the polyalkadienyl segment of the polymer.

The end-capped alkadienyl polymer is then reacted, typically in situ without the need for purification, with purified alkyl methacrylate as described above in the mixed solvent media to add a polymethacrylate block at each reactive site of the living polyalkadienyl polymer. Regardless of the type of block copolymer being produced, the relative proportion of the alkyl methacrylate to be employed will reflect the composition of the block copolymer whose production is desired. Typically, sufficient alkyl methacrylate is provided to constitute from about 10% to about 40% of the molecular weight of the block copolymer. Reaction takes place in the mixed solvent at a temperature which will depend in part on the particular alkyl group and the extent to which it is branched. Typical reaction temperatures are from about −80° C. to about 50° C., preferably from about 20° C. to about 30° C. Subsequent to the production of alkyl methacrylate block, the polymerization is terminated by reaction with a protic material, typically an alcohol such as methanol or ethanol. The block copolymer is then recovered by well known procedures such as precipitation or solvent removal.

The resulting block copolymers are of the general types AB or ABA wherein A and B have the previously stated meanings. The polymers typically have a number average molecular weight of from about 15,000 to about 1,000,000, preferably from about 20,000 to about 300,000, as determined by gel permeation chromatography. It is recognized that the polymers may contain the residue of a difunctional initiator, if such were used, and the end-capping group. The presence of such moieties will have no significant influence on the properties of the polymer so that the block copolymers are fairly represented as copolymers of alkyl methacrylate and the conjugated alkadiene. The preferred block copolymers are those wherein the total proportion of alkyl methacrylate is from about 5% to about 80% of the total molecular weight of the polymer, particularly from about 5% to about 50% of the total molecular weight. Within the polyalkadiene block, the percentage monomeric units produced by 1,4-polymerization should be from about 10% to at least about 90%.

The selectively hydrogenated block copolymers of the invention are produced by selective hydrogenation of the polyalkadiene block of the above base block copolymers without significant hydrogenation of the polymethacrylate block(s). The selective hydrogenation process is one which is broadly similar to the selective hydrogenation of block copolymers of the polystyrene-polybutadiene-polystyrene type although many of the catalysts useful in the selective hydrogenation of SBS are not selective when one of the monomers is a methacrylate ester. The block copolymer as produced above is dissolved in a solvent, preferably cyclohexane or mixed cyclohexane and ether, and is contacted with hydrogen gas in the presence of certain transition metal hydrogenation catalysts. In an illustrative embodiment, the catalyst is formed from trialkylaluminum and a soluble salt of nickel, such as nickel octoate. Hydrogenation typically takes place at temperatures from about 25° C. to about 100° C. and hydrogen pressures from about 15 psig to about 1000 psig. The hydrogenation is considered to be complete when at least about 90%, preferably from about 90% to about 98%, of the ethylenic unsaturation of the polyalkadienyl block has been hydrogenated, as can be determined by nuclear magnetic resonance or infrared spectroscopy. The selectively hydrogenated block copolymer is recovered by conventional procedures such as washing with aqueous acid to remove catalyst residues and removal of solvent or by coagulation. The selectively hydrogenated block copolymers are suitable for use in the lubricating oil compositions of the invention without further purification.

The oil component of the lubricating oil formulations of the invention is especially designed for the preparation of multi-grade lubricants. While lubricating oils of any viscosity may be used as the base for the present compositions, hydrocarbon oils preferred for the compositions have viscosities between about 150 and about 250 SSU at 100° F. and are generally described as having SAE grades of 5–50. Multigrade lubricants such as SAE 10W-30 or SAE 20W-40, for either summer or winter use are also specifically contemplated. These are usually derived from mineral oil distillates but may comprise or contain mineral oil residuals as long as the composition has lubricating properties. While low viscosity mineral oils are suitably employed, it is preferred to use those having viscosity indexes between about 120 and about 200, with the higher viscosity oils being even more preferred, especially when multigrade lubricants are to be formulated. Hydrocarbon oils employed in greases, hydraulic fluids and open gear lubricants are also suitably formulated with the selectively hydrogenated block copolymers of the invention.

The method by which the selectively hydrogenated block copolymers are incorporated within the hydrocarbon oil is not material and conventional methods for compounding lubricating oil compositions containing polymeric materials are satisfactory. The quantity of selectively hydrogenated block copolymer to be incorporated will be from about 0.5% by weight to about 5% by weight based on total composition. Quantities of selectively hydrogenated block copolymer from about 0.5% by weight to about 5.0% by weight on the same basis are preferred.

The compositions of the invention are hydrocarbon lubricating oil compositions of improved properties and are useful in the conventional applications for such oils. Because of the improved properties of dispersancy and viscosity index improvement the compositions find particular utility as lubricants for internal combustion engines.

The invention is further illustrated by the following Illustrative Embodiments which should not be regarded as limitations.

Illustrative Embodiment I

To a purged polymerization bottle equipped with a magnetic stirring bar and a heavy duty rubber septum was charged 9.52 g of isoprene and 220 ml of cyclohexane. The temperature was adjusted to approximately 45° C. in a bath. The solution was titrated with sec-butyl lithium in the presence of diphenylethylene until the red color was persistent and then 0.70 mmol of sec-butyl lithium was added. The resulting polymerization continued for 1 hour when the polymerization bottle and contents were removed from the bath and allowed to cool to approximately 25° C. Tetrahydrofuran, 180 ml, and 0.40 ml of diphenylethylene were added to the solution which slowly turned dark red. After 20 minutes, 8.8 g of t-butyl methacrylate was added in a dropwise manner. After 20 additional minutes the polymerization was terminated with methanol. The copolymer was stabilized by the addition of IRGANOX® 1010 antioxidant and isolated by precipitation with methanol. The resulting block copolymer had a number average molecular weight of 27,920 as determined by gel permeation chromatography and 32,340 as determined by $^{13}$C-NMR analysis. The 1,4-content (cis) of the polyisoprene block was 77.0% and the 1,4-content (trans) was 22.3%.

Illustrative Embodiment II

To a polymerization reactor containing 15.0 g of isoprene dissolved in a 90/10 mixture of cyclohexane and diethyl ether was added 0.5 mmol of s-butyllithium. The mixture was stirred at 45° C. for 1.25 hours when 0.26 ml of diphenylethylene was added and the color of the mixture changed from faint yellow to deep red over a period of 30 minutes. The resulting solution was allowed to cool to 25° C. The product mixture of treating 5 g of t-butyl methacrylate with 0.05 ml of a 1M hexane solution of triethylaluminum was slowly added which changed the color of the resulting mixture from red to colorless. The t-butyl methacrylate was allowed to polymerize for 30 minutes at which time the polymerization was terminated with 1 ml of methanol. The polymer was then precipitated in excess methanol and dried in an oven. The number average molecular weight, as determined by gel permeation chromatography, was 62,600 g/mole.

Illustrative Embodiment III

The difunctional initiator 1,3-bis(1-lithio-1,3-dimethylpentyl)-benzene was produced by adding m-diisopropenylbenzene to a bottle containing cyclohexane and tetrahydrofuran. The resulting mixture was warmed to 40° C. and titrated with sec-butyl lithium until a faint olive green color persisted. An additional amount of sec-butyl lithium was added sufficient to provide a molar ratio of sec-butyl lithium to tetrahydrofuran of approximately 1:10. This addition quickly turned the solution dark green but after 1 hour the solution was red-orange and completely homogeneous.

Illustrative Embodiment IV

A difunctional initiator was prepared according to the procedure of Illustrative Embodiment III from 0.6 mmol diisopropenylbenzene and 1.25 mmol sec-butyl lithium. To the resulting solution was added 28.56 g of isoprene and 400 ml of cyclohexane. After approximately 60 minutes the reaction mixture was cooled to about room temperature and 2.60 mmol of diphenylethylene and 400 ml of tetrahydrofuran were added as the solution turned from yellow to dark red. After 30 minutes, 11.44 g of t-butyl methacrylate were added slowly and the solution rapidly turned colorless. The t-butyl methacrylate polymerization was allowed to continue for 20 minutes and was then terminated with methanol. The block copolymer was stabilized with IRGANOX® 1010, precipitated in methanol and dried to constant weight in a vacuum oven. The number average molecular weight was 59,000 as determined by gel permeation chromatography.

Illustrative Embodiment V

The block copolymer products of Illustrative Embodiments I, II and IV were hydrogenated in a hydrogenation reactor in cyclohexane solution containing 2% to 5% by weight of copolymer. The catalyst used was a complex of nickel octanoate and triethylaluminum having a nickel:aluminum ratio of 1:2.3. The hydrogenation was conducted for 3 hours at a hydrogen pressure of 700-750 psi and a temperature of 41.2° C. to 78.7° C. The polymers were washed several times with aqueous hydrochloric acid to remove the catalyst residues and then coagulated in methanol. The extent of hydrogenation of the polyalkadiene block was greater than 97% in each case.

Illustrative Embodiment VI

To 98 g of a HVI 100N base oil were added 1.75 g of a hydrogenated diblock polymer of isoprene and t-butyl methacrylate and 0.004 g of IRGANOX® 1010 antioxidant. The mixture was blended at 120° C. in a Silverson mixer. A second otherwise identical blend was produced wherein the oil was MVI 200 base oil. Both blends showed improved thickening at high temperatures.

What is claimed is:

1. A selectively hydrogenated block copolymer resulting from hydrogenation of at least about 90% of the ethylenic unsaturation of an ABA block copolymer wherein A is a block of polymerized t-butyl methacrylate and B is a block of polymerized butadiene or isoprene having from about 10% to about 90% of 1,4-polymerization, wherein the polymerized t-butyl methacrylate provides from about 5% to about 80% of the molecular weight of the block copolymer.

2. The selectively hydrogenated block copolymer of claim 1 wherein B is a block of polymerized butadiene.

3. The selectively hydrogenated block copolymer of claim 1 wherein B is a block of polymerized isoprene.

4. A lubricating oil composition comprising a major proportion of a hydrocarbon oil and from about 0.1% by weight to about 5% by weight, based on total composition, of a selectively hydrogenated block copolymer resulting from hydrogenation of at least 90% of the ethylenic unsaturation of an ABA block copolymer wherein A is a block of polymerized t-butyl methacrylate and B is a block of polymerized butadiene or isoprene having from about 10% to about 90% 1,4-polymerization, wherein the polymerized t-butyl methacrylate provides from about 5% to about 80% of the molecular weight of the block copolymer.

5. The lubricating oil composition of claim 4 wherein B is a block of polymerized butadiene.

6. The lubricating oil composition of claim 4 wherein B is a block of polymerized isoprene.

* * * * *